I. KING.
Bee Hive.
No. 83,861.
Patented Nov. 10, 1868.
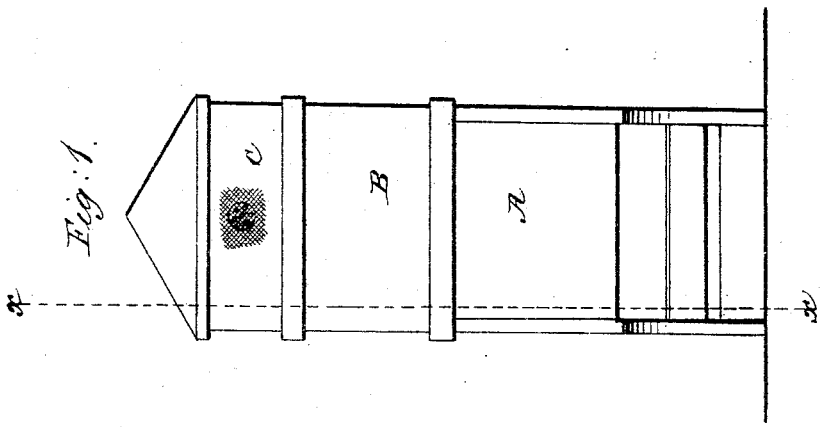
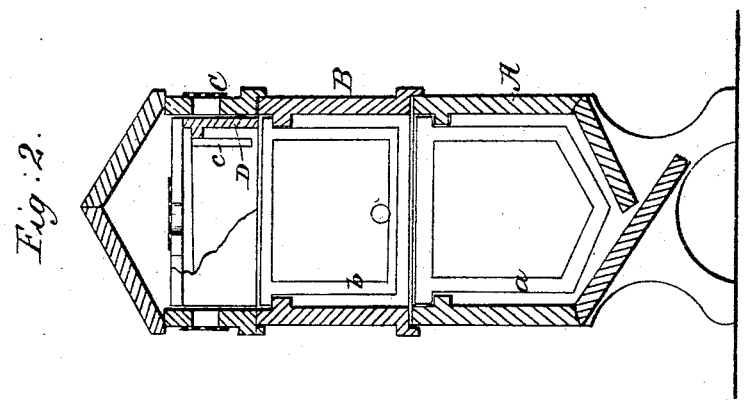

ISAAC KING, OF GERMANTOWN, OHIO.

Letters Patent No. 83,861, dated November 10, 1868.

IMPROVEMENT IN BEE-HIVES.

The Schedule referred to in these Letters Patent and making part of the same.

*To all whom it may concern:*

Be it known that I, ISAAC KING, of Germantown, in Montgomery county, in the State of Ohio, have invented certain new and useful Improvements in Bee-Hives; and I do hereby declare that the following is a full and exact description thereof, reference being had to the accompanying drawings, and to the letters of reference marked thereon.

Figure 1 represents a side elevation of my improved bee-hive.

Figure 2 represents a vertical section, taken at the line x x of fig. 1.

The outer casing of my bee-hive consists of the stands or boxes A B C; and suitable movable frames, a b c, are arranged upon cleats within the apartments.

Within the upper portion, or stand C, there is an interior removable chamber, D. The frames c are arranged within this inner chamber.

There are no partitions or diaphragms between the stands, but a continuous chamber extends from the bottom of the lower stand A to the top of the interior removable stand or box D.

The object of this interior stand D is for the double purpose of raising queen-bees in summer, and in the winter it is to be used as a stand in which the bees will be kept.

This interior box may, however, be removed, and a glass vessel, inverted, may be substituted, in which the bees may form their comb.

The openings in the sides of the uppermost stand, C, for ventilation, may be covered with wire gauze, to prevent insects from entering, and the opening in the top of the chamber D is also covered with gauze.

Bee-hives, constructed in the manner described, will be well ventilated, and at the same time the upper interior apartment will be kept warm, as the animal heat will rise and surround the upper stand D, after passing through it, and consequently the bees may be preserved during the coldest winter-weather.

The quantity of air, either warm or cold, which passes through the stands may be varied, according to the season, and this will depend upon the number of bees occupying the hive.

The intermediate stand or box, B, may be removed after the honey it contains is exhausted, and the upper stand will then rest upon the lower stand A, in near proximity to the apartment D, in which the bees will winter.

The supply of food for winter-use should be in a conveniently accessible position, for the bees, in passing from the warm interior apartment D to a distant quarter, in the cold season, will become chilled, and many of them die, before reaching the mass or family cluster, where sufficient warmth prevails.

In the earlier part of the season, the position of the interior upper chamber is most favorable for rearing queen-bees, as there the warmth from the swarm below will rise and facilitate the nurture and growth of the queens.

Having fully described my invention,

What I claim, and desire to secure by Letters Patent, is—

The combination of chamber A with removable chamber B and the interior box D and chamber C, without the interposition of a diaphragm, when the parts are constructed, ventilated, and arranged in the manner and for the purpose substantially as described.

In testimony whereof, I have hereunto set my hand, this 10th day of March, 1868.

ISAAC KING.

Witnesses:
H. P. K. PECK,
J. G. CLARK.